United States Patent
Fan et al.

(10) Patent No.: US 7,079,873 B2
(45) Date of Patent: Jul. 18, 2006

(54) METHOD AND RELATED APPARATUS FOR REDUCING CELL PHONE POWER CONSUMPTION

(75) Inventors: Chen-Huang Fan, Miao-Li Hsien (TW); Ben-Chuan Du, Taipei Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 336 days.

(21) Appl. No.: 10/708,698

(22) Filed: Mar. 19, 2004

(65) Prior Publication Data

US 2004/0185918 A1  Sep. 23, 2004

(30) Foreign Application Priority Data

Mar. 21, 2003  (TW) .............................. 92106396 A

(51) Int. Cl.
*H04B 1/38*  (2006.01)

(52) U.S. Cl. .................... 455/574; 455/343.4; 370/311
(58) Field of Classification Search ............. 455/343.1, 455/343.2, 343.4, 522, 574; 370/311
See application file for complete search history.

(56) References Cited

U.S. PATENT DOCUMENTS

| 6,339,588 | B1 * | 1/2002 | Katsuragawa | ............... 370/311 |
| 6,411,808 | B1 * | 6/2002 | Adachi et al. | .............. 455/434 |
| 6,597,929 | B1 * | 7/2003 | Han et al. | .................... 455/574 |
| 6,636,550 | B1 * | 10/2003 | Horikoshi et al. | .......... 370/311 |

* cited by examiner

*Primary Examiner*—Quochien B. Vuong
(74) *Attorney, Agent, or Firm*—Winston Hsu

(57) ABSTRACT

A method and related apparatus for reducing power consumption of a cell phone. The method includes: when the cell phone is in an idle state, connecting to a base station after a time interval several times that of the discrete receiving (DRX) time interval assigned by the base station so as to still maintain a logged-in state to the base station but to decrease radio transmissions and save power.

12 Claims, 6 Drawing Sheets

METHOD AND RELATED APPARATUS FOR REDUCING CELL PHONE POWER CONSUMPTION

BACKGROUND OF INVENTION

1. Field of the Invention

The present invention relates to a method and related apparatus for reducing transmission power consumption of a cell phone, and more particularly, to a method and related apparatus for reducing cell phone transmission power consumption by elongating the discrete receiving time interval when responding to a base station.

2. Description of the Prior Art

In today's modern information-based society, wireless communication networks allow large amounts of voice and data information to be conveniently transferred and exchanged. This ease of information access not only promotes greater interpersonal communication but also facilitates business development, knowledge and experience exchange, and technological advancement. By simply using a small, portable, and easy-to-operate cell phone; users can take advantage of the extensive communication services provided by the wireless network providers and access information at any time and from practically any place. Furthermore, the modern cell phone has integrated additional functions such as: time display, address book, calendar, photo capture, photo display, and even games. Actually, the cell phone has become a handy data processing center offering everything from data management, personal schedule arrangement to entertainment.

Please refer to FIG. 1. FIG. 1 is a functional block diagram of a conventional cell phone 10. The cell phone 10 comprises a transceiver module 14 for transmitting and receiving radio signals, a processor 12 for controlling the operation of the cell phone 10, a power management means 20, a clock generator 22, a timer 26, a power supply 24, a man machine interface (MMI) 18, a microphone 27, and a speaker 29. The processor 12 comprises a logic circuit for data operating and data processing, a volatile memory device (such as a random access memory) and a non-volatile memory device (such as a flash memory) for temporary data storage. The transceiver module 14 comprises an antenna 15 for receiving/emitting radio signals, a radio circuit 16 for processing radio frequency signals, and a signal processing means 17 for processing baseband signals. The power supply 24 is used for providing the electrical power required by the cell phone 10. The electrical power is supplied by a battery, a backup battery, and a DC power source through an AC/DC charger adaptor. The clock generator 22 generates pulses required to coordinate the interrelated timings of each circuit in the cell phone 10. The power management means 20 is used for distributing electrical power provided by the power supply 24 so as to provide electrical power to each circuit in the cell phone 10 (For example, the backup battery is used for providing electrical power when electrical power supplied by the battery is interrupted). In addition, the power management means 20 also distributes the pulses generated by the clock generator 22 to each circuit in the cell phone 10 so that if a circuit in the cell phone 10 is not in use, the clock pulses will not be supplied to that particular circuit and power consumption is reduced. The timer 26 receives the time setting from the processor 12 and according to time counting results to trigger the power management means 20 and the processor 12. An independently operated auxiliary clock generator (not shown) is also installed in the timer 26 to allow the timer 26 to measure the time passed according to the pulses generated by the auxiliary clock generator (not shown). The man machine interface 18 may comprise a display (such as a liquid crystal display), another speaker and a vibrator to provide an incoming call reminder, a keyboard for inputting control commands by the user, a backlight for the keyboard or display, and connectors connected to other peripheral devices. The user of the cell phone 10 can input control commands and signals to control the cell phone 10 as well as monitor the operational situation of the cell phone 10 by using the man machine interface 18.

When the user uses the cell phone 10 for wireless communications, the sound wave of the users voice is converted into electrical signals through the microphone 27, processed by the signal processing means 17, modulated by the radio circuit 16, transmitted to a base station 28 through the antenna 15 in the form of a radio signal, and eventually transmitted to another cell phone by the signal transferring service provided by the base station 28. In the other direction, the radio signal transmitted to the cell phone 10 (such as the radio signal emitted from another cell phone and transferred by the base station 28) is received by the antenna 15, demodulated by the radio circuit 16, processed by the signal processing means 17, and converted into a soundwave by the speaker 29 (or displayed by the man machine interface 18). Using the above-mentioned operation flow, the user of the cell phone 10 is able to conduct wireless communications.

As previously mentioned, the modern cell phone is not only used for wireless communications, but is also used for additional functions, such as data management and schedule arrangement. Generally speaking, these functions are manipulated by the user through the man machine interface of the cell phone and executed by the processor of the cell phone. When the user utilizes these additional functions, normally they will not use wireless communications at the same time. Therefore, in order to reduce power consumption, the cell phone may stop supplying electrical power to the circuits responsible for wireless communications such as the transceiver module. Additionally, when the cell phone is first turned on, the user does not normally start wireless communication right away. Therefore, the cell phone enters an idle state to reduce the power consumption of the transceiver module. Since the user moves randomly through the wireless network and the wireless communication environment changes frequently, it is necessary for the cell phone to send and receive wireless connection and exchange messages (including various parameters in wireless communication) with the base station according to wireless communication time settings so as to maintain appropriate connection between the cell phone and the base station and to be ready for access to the wireless communication network. When the user again uses the cell phone to start wireless communications, the cell phone is able to resume access to the wireless communication network.

Please refer to FIG. 2 (and also refer to FIG. 1). FIG. 2 is a flowchart illustrating the controlling procedure 100 for utilizing electrical power when the cell phone is operating. The procedure 100 comprises the following steps:

Step 102: Start. When the cell phone 10 is turned on, the procedure 100 is started.

Step 104: Login to the base station and acquire the time interval data. When the cell phone 10 is turned on, a search is performed to determine a base station that is able to provide satisfactory wireless communication services. For this discussion, assume the base station to be connected with is the base station 28 shown in FIG. 1. After the base station to be connected with is decided, the processor 12 in the cell phone 10 controls the transceiver module 14 to transmit wireless communication related messages in the form of radio signals to the base station 28. The particular wireless communication networks related identification procedure is then executed to allow the cell phone 10 to login to the wireless communication network. The base station 28 will transmit response messages in the form of radio signals to confirm the login (registration) of the cell phone 10. The base station 28 and the cell phone 10 also exchange various wireless communication parameters. For example, the base station 28 instructs the cell phone 10 to adjust the magnitude of the radio signal power used for subsequent radio signals transmitted from the cell phone 10 to match the communication environment between the cell phone 10 and the base station 28. As a result, better communication quality is achieved. Moreover, the base station 28 transmits receiving time data to the cell phone 10. From the receiving time data, the cell phone 10 acquires a discrete receiving time interval (DRX), which is another wireless communication parameter. When the cell phone 10 is in an idle state, a logged-in state to the wireless communication network is maintained by sending responses to the base station 28 and by executing wireless connections according to the receiving time interval. The following description will further discuss the operation related to the receiving time interval.

Step 106: Enter the power saving mode. If the user of the cell phone 10 does not use the cell phone 10 to start wireless communications after the cell phone 10 is turned on in step 102, the cell phone 10 enters the power saving mode in the idle state. The procedure 100 then goes to step 108. If the user wants to start wireless communications, the procedure 100 goes to step 124.

Step 108: Set the timer. After entering the power saving mode, the processor 12 will set the timer 26 according to the receiving time interval transmitted from the base station 28. In addition, the processor 12 will determine a power saving time interval according to the operational situation of the cell phone 10 and the commands of the user. The timer 26 will be set according to the power saving time interval. As previously mentioned, the cell phone 10 is not only used for wireless communications, but is also used for other additional functions. In step 108, the cell phone 10 determines the power saving time interval according to the additional functions. For example, in the man machine interface 18 the user may set the display to display various images at regular intervals to achieve a screen saver function. The time interval between the alternation of images may be defined as a power saving time interval. Generally speaking, the power saving time interval is shorter than the receiving time interval.

Step 110: Power saving operation. After step 108 is executed, the cell phone 10 operates in power saving mode. For the duration of the power saving mode, the processor 12 will set the power management means 20 to only provide electrical power to the timer 26. The power management means 20 will stop providing electrical power and pulses generated by the clock generator 22 to other circuits, especially the transceiver module 14. Thus, the power consumption of the cell phone 10 is greatly reduced during the power saving mode. The timer 26 will measure time according to the power saving time interval and the receiving time interval.

Step 112: Power saving time reached? After the cell phone 10 enters the power saving mode in step 110, the timer 26 in the cell phone 10 counts time continuously to check if the time passed after the starting point of step 110 has reached the power saving time interval or not. If the time passed reaches the power saving time interval, the procedure 100 executes step 114. In other words, a power saving time can be defined by the time of the starting point of step 110 and the power saving time interval. The difference between the power saving time and the time of the starting point of step 110 is the power saving time interval. If the power saving time is reached, the timer 26 will trigger the procedure 100 to execute step 114.

Step 114: Activate the power management means and the processor. When the timer 26 determines that the time passed after the starting point of step 110 reaches the power saving time interval, an activating signal is transmitted to the power management means 20 and the processor 12. The power management means 20 thus re-provides electrical power and the pulses generated by the clock generator 22 to each circuit of the cell phone 10. As a result, the processor 12 is supplied by electrical power and starts to execute the pre setting operation in step 108. For example, the processor 12 may control the display in the man machine interface 18 to alternate images as previously mentioned. After the processor 12 executes the corresponding operation, the procedure 100 goes back to step 108. The processor 12 may set a different power saving time interval, if necessary, to reset the timer 26, and re-enters the power saving mode in step 110. The timer 26 will check if the time reaches the power saving time interval, repeatedly, in step 112.

Step 116: Receiving time reached? When the timer 26 checks if the power saving time interval has been reached, it will also check if the time passed after the starting point of step 110 reaches the receiving time interval. A receiving time may be defined at the time one receiving time interval after the starting point of step 110. The timer 26 will start counting time continuously after the starting point of step 110 to check if the time reaches the receiving time. If the receive time is reached, the timer 26 will trigger the procedure 100 to execute step 118.

Step 118: Activate the power management means and the processor. Similar to step 114, if at step 116 the timer 26 finds that the receiving time has been reached, an activating signal is sent to drive the power management means 20 and the processor out of the power saving mode. At this time, the power management means 20 will re-supply electrical power and pulses generated by the clock generator 22 to each circuit in the cell phone 10, especially the transceiver module 14 for receiving/emitting radio signals.

Step 120: Connect with the base station to acquire the time interval data. The processor 12 supplied with electrical power at step 118 controls the transceiver module 14 to transmit a connection signal in the form of radio signals to the base station 28 so as to connect with the base station 28 and maintain the logged-in status to the wireless communication network. According to the connection signal transmitted from the cell phone 10 to the base station 28, the base station 28 will reply with a corresponding signal to change the parameters utilized for access to the wireless communication network. The base station 28 will resend new receiving time data to the cell phone 10 to assign a new receiving time interval to the cell phone 10. After the cell phone 10 reads the receiving time interval from the receiving time data, the procedure 100 goes back to step 108. After the timer 26 is reset according to the new receiving time interval, the procedure 100 goes back to step 110. Therefore, the cell phone 10 is restored to operating in the power saving mode with low power consumption. A new receiving time can be defined by the new receive time interval and the time at the starting point of the step 110. The timer 26 will continuously check if the time reaches the new receiving time in step 116 after the timer 26 is reset in step 108.

Step 122: Exit the power saving mode. While the timer 26 executes step 112 and step 116, the cell phone 10 could also exit the power saving mode by going to step 124. For example, the user interrupts the power saving mode to use the cell phone 10 to start wireless communication.

Step 124: Execute other operations. Execute other operations, such as wireless communication, rather than the power saving mode. At this time, the transceiver module 14 will be supplied with electrical power to receive/transmit radio signals.

In order to further illustrate procedure 100, please refer to FIG. 3 (and FIG. 1, 2 when needed). FIG. 3 is a timeline diagram of time points for the related steps when executing the procedure 100 of FIG. 2. In FIG. 3, the x-axis represents time and increases toward the right. Assume the procedure 100 starts at a time point tp0. Between time points tp0 and tp1, the cell phone 10 is executing step 104 to login to the base station 28 of the wireless communication network and read a receiving time interval TpD1 from the receiving time data transmitted from the base station 28. If the user does not want to use the cell phone 10 to start wireless communication at the time point tp1, the cell phone 10 will execute step 108 to set the timer according to the a power saving time interval Tps1 and receiving time interval TpD1. Then the cell phone 10 enters step 110 to operate in power saving mode at time point tp1. The timer 26 starts counting time at the time point tp1. From the time point tp1, the power saving time interval Tps1, and the receiving time interval TpD1, a power saving time tp2a and a receiving time tp4 are determined. Actually, the time difference between the power saving time and the time point tp1 and the time difference between the receiving time and the time point tp1 are equal to the power saving time interval Tps1 and the receiving time interval TpD1, respectively. At a time point tp2a, the power management means 20 and the processor are triggered to execute step 114 because the timer 26 finds the power saving time is reached. In FIG. 3, the pattern of oblique lines between the time points tp1 and tp2 represents that the cell phone 10 is in power saving mode between these two time points and the transceiver module 14 is not activated. Step 114 is assumed to be completed at a time point tp2b, and procedure 100 thus goes back to step 108. It is assumed that the processor 12 needs to define a new power saving interval Tps2 due to the requirement of subsequent operation and resets the timer 26 in step 108. The processor 12 then executes step 110 so the cell phone 10 is returned to power saving mode. From the power saving time interval Tps2 and the starting point of step 110 tp2b, a new power saving time tp3a is determined. The timer 26 will check if the power savings time tp3a is reached in step 112. At the same time, the timer 26 will continuously check if the receiving time-limit tp4 is reached. This check will not be affected by the time counting for the power saving time.

At time point tp3a, because the timer 26 judges that the power saving time is reached, step 114 is executed. The processor 12 thus executes the necessary functions and, assuming step 114 is completed at a time point tp3b, the cell phone 10 thus enters the power saving mode with low power consumption at the time point tp3b. At a time point tp4, the timer 26 judges that the receiving time is reached in step 116. The power management means 20 and the processor 12 are therefore activated in step 118. The processor 12 will control the transceiver module 14 to conduct wireless communication, transmitting connection signals to the base station 28 to ensure the logged status of the cell phone 10 to wireless communication network is maintained. The base station 28 will reply with radio signals and change the parameters of the cell phone 10 for access to the wireless communication network. It is assumed that the base station 28 transmits new receiving time data to the cell phone 10 at this point to assign a new receiving time interval TpD2. The procedure 100 thus goes to step 108 to reset the timer 26 to measure the receiving time according to the receiving time interval TpD2. After that, the procedure 100 goes to step 110 at a time point tp5 to re-enter power saving mode (in comparison with the receiving time interval, the duration required from steps 118, 120 to steps 108, 110 is much shorter; in other words, the time point tp4 is very close to the time point tp5). From the time point tp5 and the new receive time interval TpD2, a new receiving time tp7 is determined. The timer 26 will check if the time reaches the receiving time limit in step 116. In addition, the timer 26 will count the power saving time according to the power saving time interval so that the power management means 20 and the processor 12 can be activated at the power saving time to execute necessary functions and operations. For example, when the time reaches another power saving time at time point tp6a, the timer 26 will drive the procedure 100 to execute step 114 and go back to step 110 at time point tp6b. At the same time, the timer 26 won't be affected by the resetting and time counting of the power saving time and will continuously check if the time reaches the receiving time.

At a receiving time tp7, the timer 26 will trigger the procedure 100 to again execute steps 118, 120. The cell phone 10 thus re-activates the transceiver module 14 to exchange radio signals with the base station 28 to maintain the logged-in status and acquire a new receiving time interval TpD3. When the procedure 100 moves from steps 118, 120 and then back to steps 108 and 110, another receiving time tp9 is determined according to a time point tp8 at the starting point of step 110 and the receiving time interval TpD3. The timer 26 will start counting new receiving time in step 116 and the procedure 100 continues accordingly. It is worth noticing that the duration for the cell phone 10 to execute the additional functions in step 114 may cover the receiving time. For example, if the processor 12 starts to execute step 114, having a longer duration, at the time point tp3a, the time point at the ending point of step 114 tp3b thus exceeds the time point tp5. If so, the timer 26 will execute step 118 at the time point tp4 to remind the processor to execute step 120, that means, to exchange radio signals with the base station 28 so as to maintain the logged-in status. However, since the power management means 20 has been activated (at the time point tp3a) when step 114 was activated, the power management means 20 is not activated in step 118.

As described above, when the cell phone 10 is in the idle state or executes additional functions rather than radio communication, the timer 26 will trigger the processor 12 according to the receiving time interval assigned by the base station 28. The processor 12 controls the transceiver module 14 to transmit connection signals to the base station 28. By intermittently transmitting and receiving discrete radio signals, the logged-in status to the wireless communication network is maintained. Actually, the receiving time interval assigned by the base station 28 can be regarded as the time slot allocated for the cell phone 10. When the cell phone 10 determines the receiving time according to the receiving time interval, the base station 28 will wait for the signals transmitted from the cell phone 10 at the receiving time. Since the base station 28 may be simultaneously providing service to the wireless communication network for many different cell phones, time division multiplexing is used to allow access to the wireless communication network for different cell phones at different times. According to the receiving time interval assigned to each cell phone, the base station 28 will allocate a different time slot for each cell phone so as to achieve the time multiplexing for a plurality of cell phones. However, one characteristic of wireless communication by cell phone is that the wireless communication environment between the cell phone and the base station is time dependent. For example, the user of the cell phone may change his site, or some obstacle may pass between the cell phone and the base station. In addition, the number of cell phones relying on the same base station for access to the wireless communication network may change with time. Therefore, when the cell phone 10 connects with the base station 28 according to the receiving time interval, the base station 28 will change the wireless communication parameters of the cell phone 10 according to the wireless communication situation and adjust the receiving time interval as necessary.

According to the existing wireless communication specification, if the base station 28 does not receive the connection signal transmitted from the cell phone 10 at a specific receiving time determined from a receiving time interval (for example, the connection signal transmitted from the cell phone 10 to the base station 28 is not received by the base station 28 for some reason), the base station 28 will allocate the cell phone 10 a time slot at each receiving time interval TD and wait for the radio communication signals transmitted from the cell phone 10 again. If the cell phone 10 does not receive the response transmitted from the base station 28 after transmitting the connection signal, the cell phone 10 will retransmit the connection signal at each receiving time interval TD to try to connect with the base station 28 so as to maintain the logged-in status to wireless communication network. Please refer to FIG. 2 for the abovementioned operation. For example, when the cell phone 10 transmits the connection signal to the base station 28 at the time point tp7, the base station 28 responds and assigns a receiving time interval TpD3. The cell phone 10 enters the power saving mode at a time point tp8 and a new receiving time tp9 is determined. The timer 26 starts to count time. If the cell phone 10 transmits the connection signal according to the pre-set operation at the time point tp9 and the base station 28 does not receive the connection signal transmitted from the cell phone 10, the base station 28 will be unable to respond to the cell phone 10. After another receiving time interval TpD3 (at the time point tp10), the base station 28 will allocate the cell phone a time slot and wait for another connection signal transmitted from the cell phone 10. If, similarly, the cell phone 10 does not receive the response signal transmitted from the base station 28 after transmitting the connection signal at the time point tp9, it will re-transmit the connection signal to the base station 28 after another receiving time interval TpD3 (the time point tp10). In other words, the time point tp10 becomes a new receiving time. The timer 26 will check if the time reaches the receiving time in step 116, and activate the power management means 20 and the processor 12 at the time point tp10 to transmit the connection signal in the form of radio signals to the base station 28 through the transceiver module 14 (steps 118, 120). If the connection signal transmitted from the cell phone 10 at the time point tp10 is not received by the base station 28, the base station 28 and the cell phone 10 will determine a new receiving time tp11 according to the previous receiving time interval TpD3 and the time point tp10. According to the current wireless communication specification, the cell phone 10 and the base station 28 will try to establish a connection at the time point tp11. If the connection signal transmitted from the cell phone 10 is received by the base station 28 at the time point tp11, the base station 28 will reply to the cell phone 10, maintain the logged-in status of the cell phone 10 to the wireless communication network, and assign another receiving time interval TpD4 to the cell phone 10. The cell phone 10 and the base station 28 will execute wireless communication at the next receiving time determined by the receiving time interval TpD4. In short, if the cell phone and the base station do not establish wireless communication successfully at a specific receiving time determined by a specific receiving time interval, the cell phone and the base station will try to establish wireless communication again at the time points which are a multiple of the receiving time interval from the specific receiving time. In the above-mentioned example, the time difference between the time points tp9, tp10, tp11 and the time point tp8 (the time at which the cell phone 10 acquires the receive time interval TpD3) are one time, two times, and three times of the receiving time interval TpD3.

In order to maintain the logged-in status of the cell phone 10 to the wireless communication network, the cell phone 10 and the base station 28 only need to execute discrete wireless connections intermittently every receiving time interval. Thus, the cell phone 10 does not need to turn on the transceiver module 14 to transmit radio signals in the receiving time interval period between the two wireless connections. As a result, the power consumed by receiving/transmitting radio signals is greatly reduced. If the cell phone 10 is unable to connect with the base station 28 and interrupts the logged-in status to the base station 28 during the above-mentioned power saving mode, the cell phone 10 then needs to re-execute step 104 when the user uses the cell phone 10 to start wireless communication. This consumes a lot of time and power due to searching for a qualified base station. In addition, the procedures for logging in to the wireless communication network need to be executed once again, bringing inconvenience and delay to the user.

Although, according to the prior art flowchart shown in FIG. 2, the cell phone 10 can enter the power saving mode to avoid power consumption due to continuous wireless communication when the cell phone 10 is in the idle state or when the user is using the additional functions, the cell phone 10 still needs to execute discrete wireless connections according to the receiving time interval assigned by the base station. The power distribution is not flexible. The power consumption incurred from the wireless connection cannot be further reduced since the logged-in status to the wireless communication network needs to be maintained. Presently, the function of call rejecting is also in use. However, a cell phone supporting call rejection still follows the prior art procedure 100 shown in FIG. 2 in order to execute a wireless connection according to the receiving time interval assigned by the base station. In other words, even while the call rejection function is working, intermittent wireless connections are still necessary and this consumes power. Due to continued wireless connections, call rejection does not reduce the power consumption.

SUMMARY OF INVENTION

It is therefore a primary objective of the present invention to provide a method and related apparatus to reduce the power consumption due to the intermittent discrete wireless connections made during the power saving mode and to have a power saving mode which is more flexible and less power consuming while still ensuring the logged-in status to the wireless network.

In the prior art, the cell phone in power saving mode needs to establish a wireless connection with the base station at specific time points according to the receive time interval assigned by the base station to maintain the logged-in status of the cell phone to the wireless communication network. This power saving mode is not flexible and the intermittent discrete wireless connections consume a great amount of power.

It is an advantage of the present invention that the present invention cell phone multiplies the receiving time interval assigned by the base station with an integer number greater than one to determine a virtual receiving time interval, and executes discrete wireless connection with the base station according to the receiving time determined from the virtual receive time interval. According to the wireless communication specification, the logged-in status of the cell phone to wireless communication network is maintained when executing discrete wireless connections at a time interval that is several times that of the receiving time interval. Owing to the elongated time interval between discrete wireless connections, the power consumption due to wireless connections within a specific period of time is reduced when compared with the prior art. In summary, the present invention is not only compliant with the current wireless communication specification, but also further reduces power consumption compared to the prior art while maintaining the logged-in status to wireless communication network while in the power saving mode. In addition, the present invention can set different power saving modes to multiply the receiving time interval assigned by the base station with different integer numbers greater than one, according to different power saving modes, to increase the flexibility in operation.

This and other objectives of the present invention will no doubt become obvious to those of ordinary skill in the art after having read the following detailed description of the preferred embodiment which is illustrated in the various figures and drawings.

DETAILED DESCRIPTION

Figure 1:
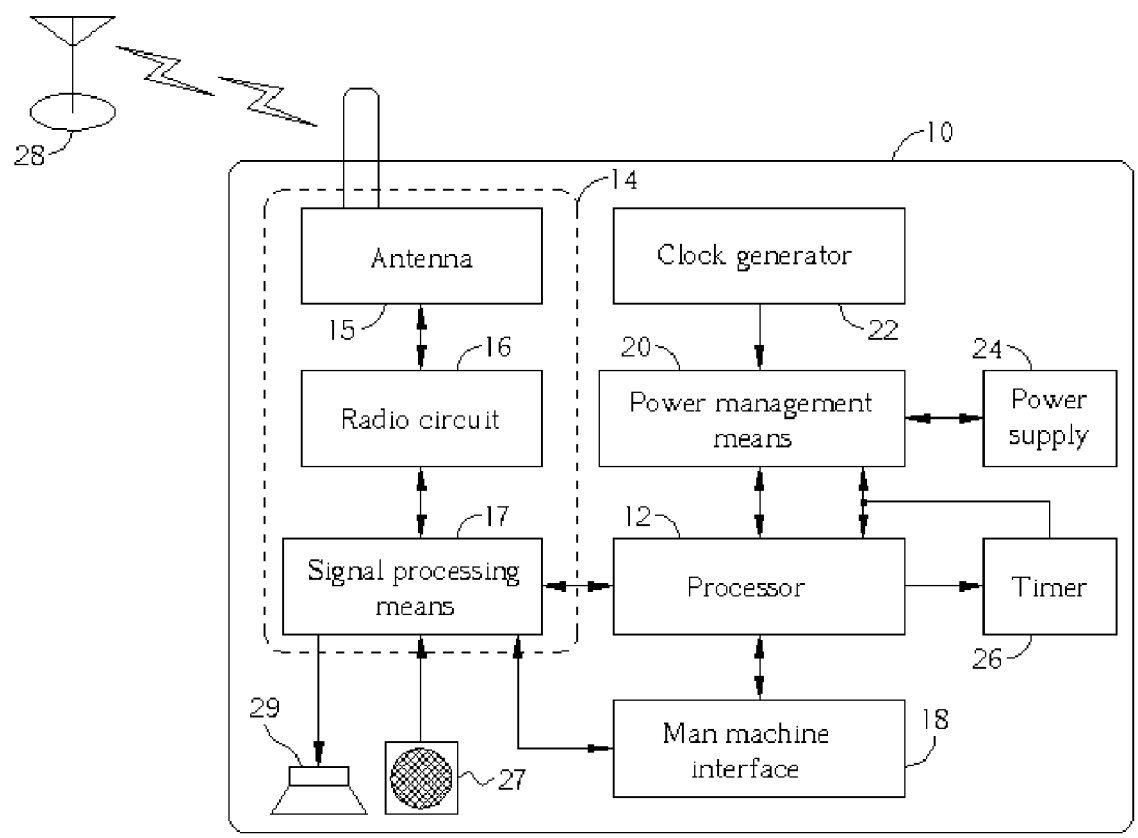
FIG. 1 is a functional block diagram of a conventional cell phone.
Figure 2:
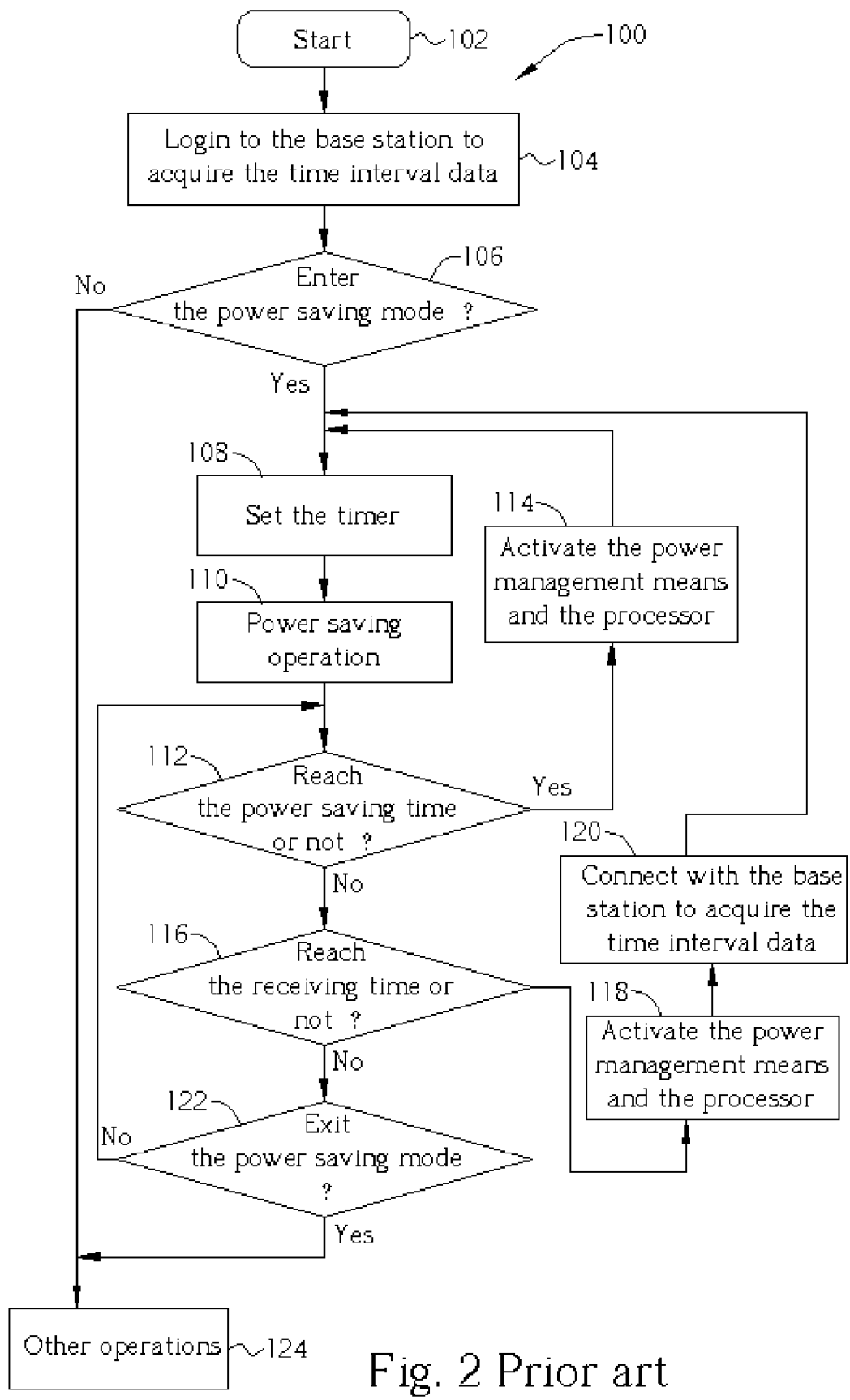
FIG. 2 is a flowchart illustrating the controlling procedure for utilizing electrical power when the cell phone is operating according to the prior art.
Figure 3:
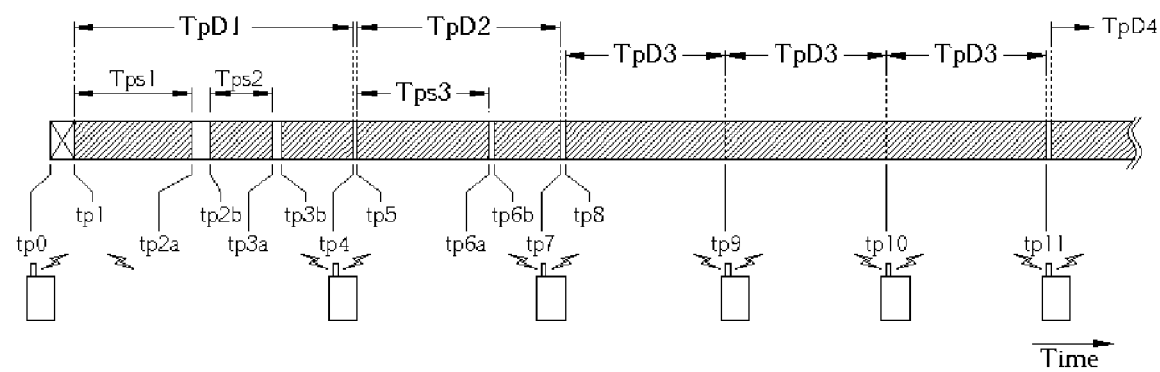
FIG. 3 is a timeline diagram of time points for each step when executing the procedure of FIG. 2.
Figure 4:
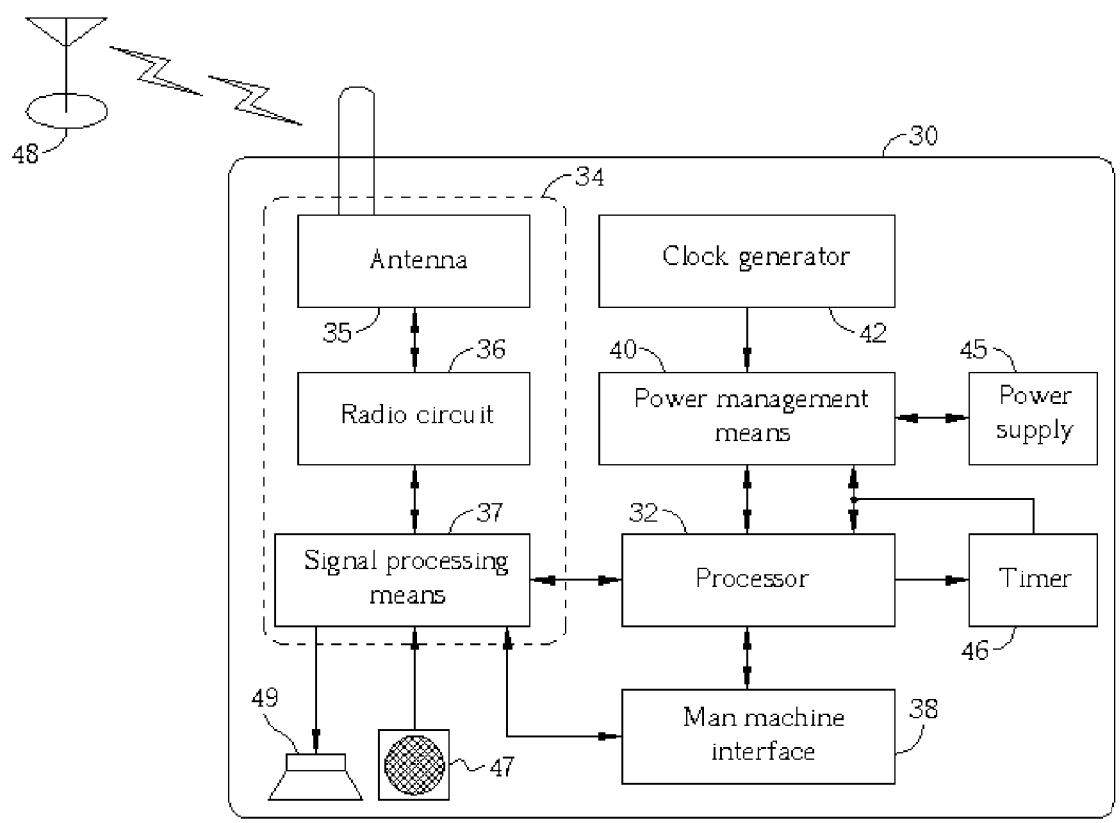
FIG. 4 is a functional block diagram of a cell phone according to the present invention.

Please refer to FIG. 4. FIG. 4 is a functional block diagram of a cell phone 30 according to the present invention. As shown in FIG. 4, the cell phone 30 comprises a transceiver module 34, a processor 32, a power management means 40, a power supply 45, a clock generator 42, a man machine interface 38, a timer 46, a microphone 47, and a speaker 49. The transceiver module 34 is used for transmitting and receiving radio signals for the cell phone 30. An antenna 35, a radio circuit 36, and a signal processing means 37 are installed in the transceiver module 34. The processor 32 is used for controlling the operation of the cell phone 30. A logic circuit for data processing as well as a volatile memory device (such as a random access memory) for storing data temporary and a non-volatile memory device (such as a flash memory) are installed in the processor 32 so that the processor 32 can store the firmware of the controlling procedures of the cell phone 30 and parameters related to operation. The clock generator 42 is used for generating pulses. The power supply 45 comprises a battery, a backup battery, and a DC power supply through an AC/DC charger adaptor. The power management means 40 is used for distributing the electrical power provided by the power supply 45 to each circuit in the cell phone 30. In addition, pulses generated by the clock generator 42 are provided to each circuit in the cell phone 30 through the power management means 40 so that when a circuit in the cell phone 30 is not in use, the clock pulses will not be supplied to that particular circuit and power consumption is reduced. The timer 46 is used for measuring time and receives a time setting from the processor 32 to send an activating signal to the processor 32 and the power management means 40 according to the time measuring results. The man machine interface 38 may comprise a display (such as a liquid crystal display), a keyboard for inputting control commands by the user, another speaker and a vibrator for incoming call alert, a backlight for a keyboard or a display, and connectors connected to other peripheral devices. The user of the cell phone 30 controls and monitors the operational situation of the cell phone 30 through the man machine interface 38.

When a user uses the cell phone 30 for wireless communication, the sound wave of the users voice is received by the microphone 47 and converted into electrical signals. These signals are then processed by the signal processing means 37 in the transceiver module 34 and the radio circuit 36, transmitted to a base station 48 through the antenna 35 in the form of radio signals. Finally, the signal transferring service provided by the base station 48 will transmit the signals to another cell phone. In the other direction, the radio signals transmitted to the cell phone 30 from the base station 48 are received by the antenna 35, processed by the radio circuit 36 and the signal processing means 37, and converted into sound waves by the speaker 49 (or displayed by the man machine interface 38 in the case of a non voice message).

Figure 5:
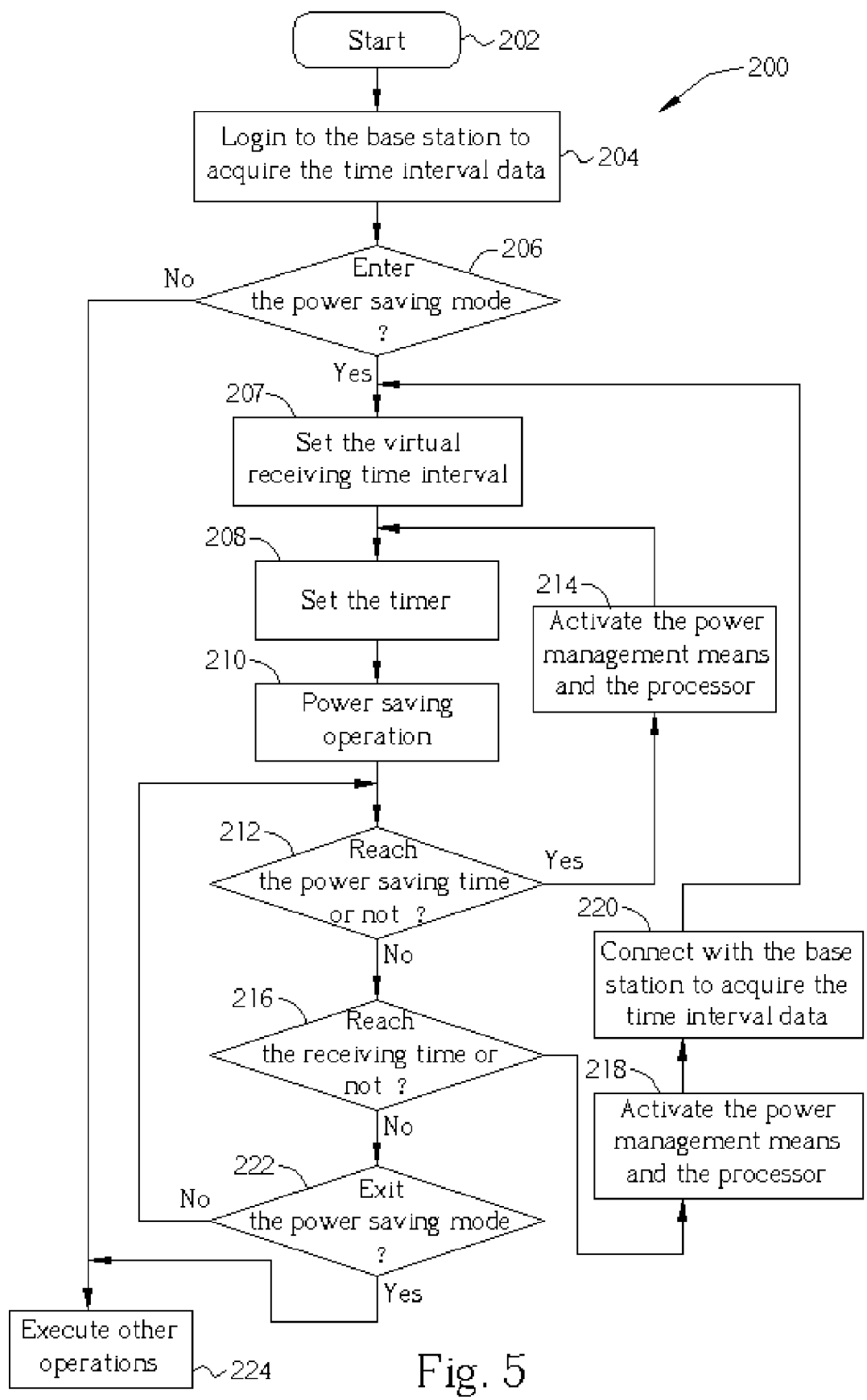
FIG. 5 is a flowchart illustrating the controlling procedure for utilizing electrical power when the cell phone is operating according to the present invention.

As previously mentioned, the modern cell phone has a variety of additional functions to provide the user with extra services other than wireless communication. When the user utilizes these additional functions and when the cell phone is in an idle state, the cell phone will enter the power saving mode to reduce power consumption. Please refer to FIG. 5 (and also refer to FIG. 4). FIG. 5 is a flowchart illustrating the controlling procedure 200 for utilizing electrical power when the cell phone 30 is operating according to the present invention. The procedure 200 comprises the following steps:

Step 202: Start. When the cell phone 30 is turned on, the procedure 200 is started.

Step 204: Login to the base station and acquire the time interval data. When the cell phone 30 is turned on, the processor 32 will control the transceiver module 34 to search for the base station that is able to provide satisfactory communication services. In the following discussion, assume the base station found is the base station 48 shown in FIG. 4. A wireless connection with the base station 48 is established. The necessary identification procedure is then executed to allow the cell phone 30 to login to the wireless communication network. After that, the service for access to the wireless communication network is executed. The base station 48 and the cell phone 30 also exchange various wireless communication parameters according to the communications environment between the base station 48 and the cell phone 30. The base station 48 also transmits receiving time data to the cell phone 30 to assign a receiving time interval.

Step 206: Enter power saving mode. If the user of the cell phone 30 does not use the cell phone 30 to start wireless communications, the cell phone 30 enters the power saving mode (for example, if wireless communication is not executed during a predefined period of time after the cell phone is turned on, the cell phone enters the power saving mode). Moreover, when the user utilizes the additional functions of the cell phone 30, the user may configure the cell phone 30 to enter the power saving mode. Or when the cell phone 30 executes the additional functions, the cell phone 30 may enter the power saving mode according to a predefined setting of the particular additional function. For example, the user (or the maker of the cell phone 30) may set the cell phone to enter the power saving mode automatically when executing the function of calendar. That means, the processor 32 of the cell phone 30 will make the cell phone 30 enter the power saving mode when the user utilizes the calendar function. The processor 32 will set a power saving time interval according to the additional functions executed by the cell phone 30 under the power saving mode, and then execute step 207. If, however, the user wants to start wireless communications, the procedure 200 goes to step 224.

Step 207: Set the virtual receiving time interval. In this step, the processor 32 of the cell phone 30 determines a virtual receiving time interval according to the receiving time interval assigned by the base station 48. In the preferred embodiment of the present invention, the receiving time interval is multiplied by a predefined integer ratio greater than one to determine the virtual receiving time interval. Therefore, the virtual receiving time interval is longer than the receiving time interval assigned by the base station 48. The predefined ratio may be determined according to the additional functions executed by the cell phone 30 in step 206. For example, when the user utilizes the function of calendar of the cell phone 30, the predefined ratio could be three; but when the user utilizes the function of address book of the cell phone 30, the predefined ratio could be two. These predefined ratios are flexible. In order to prevent the virtual receiving time from being too long, an maximum allowable receiving time interval is set in the present invention. The maximum allowable receiving time interval represents the upper limit of the virtual receiving time interval. If the virtual receiving time interval, determined by multiplying the receiving time interval assigned by the base station 48 with the predefined ratio, is longer than the maximum allowable receiving time interval, an integer multiple of the receiving time interval must be subtracted from the virtual receiving time interval. The shortened virtual receiving time interval uses the maximum integer multiple of receiving time intervals that does not cause the virtual receiving time interval to exceed the maximum allowable receiving time interval. For example, if the receiving time interval assigned by the base station 48 is T, the predefined ratio is four, and the maximum allowable receiving time interval is 3.3T, the virtual receiving time interval must be adjusted from 4T to 3T to make the virtual receiving time shorter than the maximum allowable receiving time interval. In the previous case, if the predefined ratio is two, the virtual receiving time determined by multiplying the receiving time interval with the predefined ratio should be 2T. In this case, the determined virtual receiving time interval is shorter than the maximum allowable receiving time interval. The allowable receiving time interval may be preset by the maker of the cell phone 30, or may be set by the user, or may be set by the processor 32 depending on the situation of wireless communications between the processor 32 and the base station 48.

Step 208: Set the timer. Set the timer 46 according to the virtual receiving time interval determined in step 207 and the power saving time interval determined in step 206.

Step 210: Power saving operation. After executing steps 207 and 208, the cell phone 30 operates in power saving mode. The power management means 40 only provides electrical power to the timer 46 and stops providing electrical power and pulses generated by the clock generator 42 to other circuits (especially the transceiver module 34) to reduce the power consumption of the cell phone 30. At this time, the timer 46 will start counting time according to the settings made in step 208.

Step 212: Power saving time reached? The power saving time may be defined by the time of the starting point of step 210 and the power saving time interval. The timer 46 will keep measuring time continuously to check if the elapsed time reaches the power saving time. When the time passed reaches the power saving time, step 214 is executed.

Step 214: Activate the power management means and the processor. When the timer 46 determines the time reaches the power saving time, an alarm signal is transmitted to the power management means 40 and the processor 32. The power management means 40 then provides electrical power and the pulses generated by the clock generator 42 to other circuits of the cell phone 30 to allow the processor 32 to execute the additional functions set in step 206. After executing the additional functions, the procedure 200 goes to step 208 to reset the power saving time interval and re-enter the power saving mode in step 210.

Step 216: Receiving time reached? When the timer 46 checks if the power saving time has been reached, it will also check if the time passed after the starting point of step 210 reaches the virtual receiving time interval. Using the time of the starting point of step 210 and adding the virtual receiving time interval, a receiving time is determined. The timer 46 will continuously check if the time reaches the receiving time. When the timer 46 finds the time reaches the receiving time, the timer will trigger the procedure 200 to execute step 218.

Step 218: Activate the power management means and the processor. If the time reaches the receiving time, the timer 46 will transmit an activating signal to the power management means 40 and the processor 32. As a result, the power management means 40 supplies electrical power and the pulses generated by the clock generator 42 to each circuit in the cell phone 30.

Step 220: Connect with the base station to acquire the time interval data. The processor 32 controls the transceiver module 34 to transmit a connection signal to the base station 48. This allows the base station 48 to confirm the logged-in status of the cell phone 30 to the wireless communication network and it responds to the cell phone 30 with radio signals instructing the cell phone 30 to change the parameters related to wireless network communication. At this time, the cell phone 30 will receive a new receiving time interval assigned by the base station 48. When completed, the procedure 200 goes back to step 207 to re-determine a new virtual receiving time interval according to the new receiving time interval and the predefined ratio (and the maximum allowable receiving time interval) in step 207. The timer 46 is reset according to the virtual receiving time interval in step 208 and starts to count the time for executing the next discrete wireless communication according to the virtual receiving time. The procedure 200 then goes to step 210 and the cell phone 30 re-enters the power saving mode.

Step 222: Exit the power saving mode. If the user wants to exit the power saving mode, the procedure goes to step 224. (For example if the user, after utilizing the additional functions of the cell phone 30, starts a wireless communication).

Step 224: Execute other operations. This step mainly refers to wireless communication rather than the power saving mode.

According to the procedure 200 illustrated above, the present invention sets a virtual receiving time interval that is several multiples of the receiving time interval to elongate the time interval between two discrete wireless connections. This method is compliant with the existing wireless communication specification and does not affect the logged-in status of the cell phone 30 to the wireless communication network. Therefore, the power consumption due to intermittent discrete wireless connections within a specific time period is reduced. As shown in procedure 200, to further reduce the power consumption due to discrete wireless communication, the timer 46 and the processor 32 may automatically execute the abovementioned power saving procedure in the background when the user uses the cell phone 30 to execute the additional functions.

Figure 6:
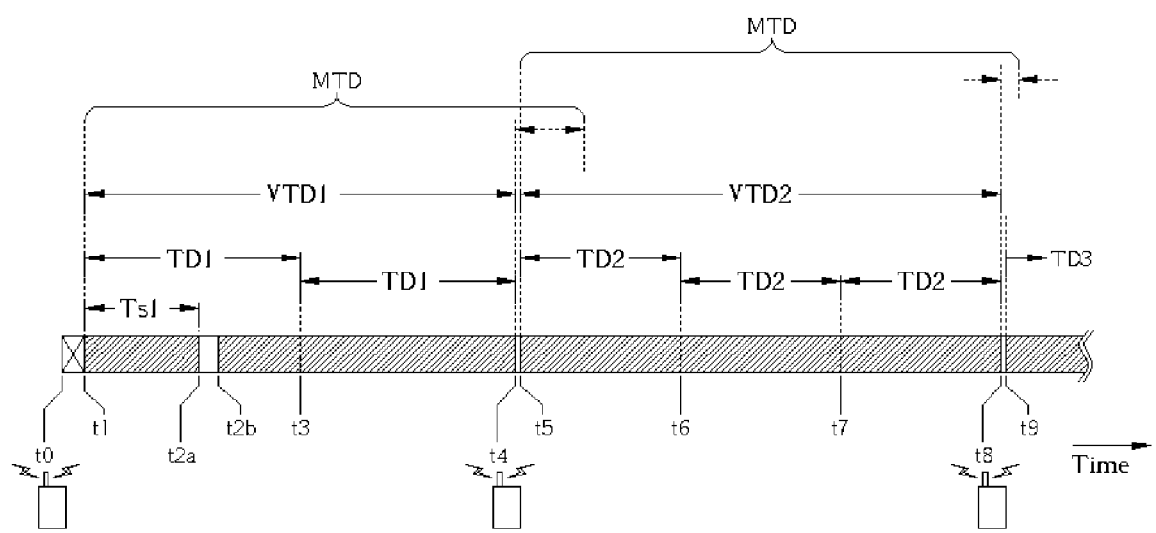
FIG. 6 is a timeline diagram of time points for each step when executing the procedure of FIG. 5.

To illustrate the procedure 200 of the present invention more clearly, please refer to FIG. 6 (and also refer to FIG. 4 and FIG. 5). FIG. 6 is a timeline diagram of time points for each step when executing the procedure 200. In FIG. 6 the x-axis represents time. Assume the cell phone 30 is turned on at a time point t0. Between time points t0 and t1, the cell phone 30 executes step 204 to establish a wireless connection with the base station 48 by utilizing the transceiver module 34 to receive/transmit radio signals and login to the wireless communication network. Additionally, the base station 48 transmits the receiving time data, including the receiving time interval, to the cell phone 30. Assume the receiving time interval assigned to the cell phone 30 by the base station 48 is TD1. However, the receiving time interval TD1 will not be used for setting the receiving time when the procedure 200 enters the power saving mode in step 206. Rather, the virtual receiving time interval which is a multiple of the receiving time interval TD1 is determined in step 207. If, in step 207, the predefined ratio is 3 and the maximum allowable receiving time interval is MTD as shown in FIG. 6, when the receiving time interval TD1 is multiplied by the predefined ratio, the obtained time duration exceeds the maximum allowable receiving time interval MTD. Therefore, the processor 32 of the cell phone 30 will set the virtual receiving time interval VTD1 as two times of the receiving time interval TD1 in step 207 and set the timer 46 according to the virtual receiving time interval VTD1 in step 208. The processor 32 then enters the power saving mode in step 210 and to reduce the total power consumption of the cell phone 30, the power management means 40 only supplies electrical power to the timer 46. Assume the processor 32 sets the timer 46 according to a power saving time interval Ts1 in step 208. The power saving time t2a and the receiving time for executing discrete wireless communication t4 are determined according to the time of the starting point of step 210 t1, the power saving time interval Ts1, and the virtual receiving time interval VTD1. At the time point t2a, the timer 46 will trigger the procedure 200 to execute step 214 to re-activate the power management means 40 and supply electrical power and clock pulses to each circuit of the cell phone 30. The processor 32 then controls each circuit to execute the predefined additional functions in step 206. In FIG. 6, the area between the time points t1 and t2a is marked with oblique lines representing the cell phone 30 is under a low power consumption mode and between the two time points does not need to activate the transceiver module 34. Assuming the processor 32 ends step 214 at the time point t2b, the procedure 200 will return to step 208 and then 210 to reset the timer 46 for the time counting of the power saving time (if necessary) and re-enters the power saving mode.

According to the starting point of step 210 (time point t1) and the receiving time interval TD1 assigned to the cell phone 30 by the base station 48, the timer 46 of the cell phone 30 will trigger the procedure 200 to execute steps 218 and 220 at the time point t3 so as to establish a wireless connection with the base station 48. In the present invention, the cell phone 30 will not receive/transmit radio signals at the time point t3. Rather, the timer 46 will delay triggering the procedure 200 to execute steps 218 and 220 until the receiving time t4 as determined by the virtual receiving time interval VTD1. The power management means 40 starts to provide electrical power and the processor 32 controls the transceiver module 34 to transmit the connection signal to the base station 48 to maintain the logged-in status of the cell phone 30 to wireless communication network. As mentioned previously, even though the base station does not receive the expected connection signal during the allocated timeslot for the cell phone, according to the current wireless communication specification, the base station 48 will re-allocate the same cell phone a new time slot at each receiving time interval and wait for the connection signal transmitted from the cell phone. In FIG. 6, the cell phone 30 does not send the connection signal at the appointed time point t3 determined according to the receiving time interval TD1 assigned by the base station 48. However, the base station 48 will allocate a time slot for the cell phone 30 at the time point t4, which is one receiving time interval TD1 from the time point t3, and will wait for the connection signal transmitted from the cell phone 30. Therefore, the procedure 200 according to the present invention postpones the receiving time from the time point t3 to the time point t4. The wireless connection signal is transmitted to the base station 48 at the time point t4. Under these circumstances, the cell phone 30 can still establish a wireless connection with the base station 48 to successfully maintain the logged-in status of the cell phone 30 to wireless communication network.

At the time point t4, the base station 48 assigns another receiving time interval TD2 to the cell phone 30. After ending the wireless connection with the base station 48, the procedure 200 goes to step 207 to set a new virtual receiving time interval VTD2 according to the new receiving time interval TD2. As previously mentioned for this example, the predefined ratio in step 207 is three. If the receiving time interval TD2 is short, the virtual receiving time interval, which in this example is three times the receiving time interval TD2, is shorter than the maximum allowable receiving time interval (This is shown in FIG. 6). In step 208, the processor 32 resets the timer 46 to start counting time to determine the receiving time according to the virtual receiving time interval VTD2, which in this example is three times the receiving time interval TD2. The procedure 200 then goes back to the power saving mode at time point t5. According to the receiving time interval TD2 assigned by the base station 48, the cell phone 30 will send a connection signal again at time point t6 to execute a wireless connection with the base station 48. If the base station 48 does not receive the connection signal transmitted from the cell phone 30, it will allocate the time division timeslot at time points t6, t7, and t8, which are one time, two times, and three times the receiving time interval TD2 from the time point t5, and wait for the wireless connection signal transmitted from the cell phone 30. This is why the present invention sets the virtual receiving time interval with a predefined, greater than one, integer ratio. According to the virtual receiving time interval VTD2, the timer 46 will not trigger the procedure 200 until the time point t8. At time point t8 the procedure 200 re-executes steps 218 and 220 so as to execute a discrete wireless connection and acquire another receiving time interval TD3 assigned by the base station 48 and to maintain the logged-in status to wireless communication network. With the logged-in status maintained by each discrete wireless connection, the cell phone 30 is ready to access to the wireless communication network.

In summary, the prior art cell phone maintains the logged-in status of the cell phone to wireless communication network by executing discrete wireless connections with the base station according to the time points assigned by the base station. This method results in frequent discrete wireless connections and consumes a great amount of power due to frequent need to receive/transmit radio signals. Compared with the prior art cell phone, the present invention elongates the time interval between two discrete wireless connections by utilizing the current wireless communication specification and maintains the logged-in status to the wireless communication network. Therefore, the frequency of executing wireless connections with the base station is decreased to further reduce the power consumption when compared with the power saving mode in the prior art. The present invention can set different virtual receiving time intervals when using different additional functions, bringing increased flexibility in practical use.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. A method for reducing transmission power consumption of a cell phone, the cell phone comprising:
    a transceiver module for transmitting signals to a base station and receiving signals transmitted from the base station; and
    a processor for controlling operation of the cell phone;
    wherein when the transceiver module receives a receiving time data transmitted from the base station, the processor reads a receiving time interval from the receiving time data; if the processor transmits a connection signal to the base station through the transceiver module after the receiving time interval, the base station transmits another receiving time data to the cell phone;
    the method comprising:
    when the transceiver module receives the receiving time data transmitted from the base station, determining a virtual receiving time interval according to the receiving time interval in the receiving time data, the virtual receiving time interval being longer than the receiving time interval;
    stopping signal transmission to the base station until the virtual receiving time interval is passed; and
    resuming the connection signal transmission to the base station after the virtual receiving time interval.

2. The method of claim 1 wherein the virtual receiving time interval is an integer multiple of the receiving time interval.

3. The method of claim 1 wherein in determining the virtual receiving time interval according to the receiving time interval in the receiving time data, the receiving time interval is multiplied by a predefined ratio greater than one.

4. The method of claim 3 further comprising:
    if the virtual receiving time interval determined is longer than a predefined maximum allowable receiving time interval, subtracting at least one receiving time interval from the virtual receiving time interval so that the virtual receiving time interval is shorter than the maximum allowable receiving time interval, and the time difference between the maximum allowable receiving time interval and the virtual receiving time interval is not longer than the receiving time interval.

5. The method of claim 1 wherein if the processor transmits the connection signal to the base station through the transceiver module after an integer multiple of the receiving time interval rather than at the receiving time interval, the base station transmits another receiving time data to the cell phone.

6. The method of claim 1 wherein the transceiver module is used for transmitting radio signals to the base station and receiving radio signals transmitted from the base station to the cell phone.

7. A cell phone comprising:
    a transceiver module for transmitting signals to a base station and receiving signals transmitted from the base station; and
    a processor for controlling operation of the cell phone;
    wherein when the transceiver module receives a receiving time data transmitted from the base station, the processor reads a receiving time interval from the receiving time data; if the processor transmits a connection signal to the base station through the transceiver module after the receiving time interval, the base station transmits another receiving time data to the cell phone; when the transceiver module receives a receiving time data from the base station, a virtual receiving time interval is determined by the processor according to the receiving time interval in the receiving time data such that the virtual receiving time interval is longer than the receiving time interval; the transceiver module stops transmitting signals to the base station at the virtual receiving time interval after the virtual receiving time interval is determined and resumes to transmit the connection signal to the base station after the virtual receiving time interval is passed.

8. The cell phone of claim 7 wherein the virtual receiving time interval is an integer multiple of the receiving time interval.

9. The cell phone of claim 7 wherein the processor multiplies the receiving time interval by a predefined ratio greater than one to determine the virtual receiving time interval according to the receiving time interval in the receiving time data.

10. The cell phone of claim 9 wherein if the virtual receiving time interval determined by the processor is longer than a predefined maximum allowable receiving time interval, the processor subtracts at least one receiving time interval from the virtual receiving time interval so that the virtual receiving time interval is shorter than the maximum allowable receiving time interval, and the time difference between the maximum allowable receiving time interval and the virtual receiving time interval is not longer than the receiving time interval.

11. The cell phone of claim 7 wherein if the processor transmits the connection signal to the base station through the transceiver module after an integer multiple of the receiving time interval rather than at the receiving time interval, the base station transmits another receiving time data to the cell phone.

12. The cell phone of claim 7 wherein the transceiver module is used for transmitting radio signals to the base station and receiving radio signals transmitted from the base station to the cell phone.

* * * * *